(12) United States Patent
Komori

(10) Patent No.: US 6,818,386 B2
(45) Date of Patent: Nov. 16, 2004

(54) METHOD FOR MANUFACTURING A BONDED OPTICAL DISC

(75) Inventor: Noboru Komori, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 171 days.

(21) Appl. No.: 10/223,482

(22) Filed: Aug. 20, 2002

(65) Prior Publication Data

US 2003/0041954 A1 Mar. 6, 2003

(30) Foreign Application Priority Data

Aug. 24, 2001 (JP) ........................ 2001-254076

(51) Int. Cl.⁷ .................. G03C 5/00; B32B 17/00; B32B 3/02
(52) U.S. Cl. .................. 430/321; 430/330; 156/99; 156/163; 156/196; 156/275.7; 428/64.2; 427/314
(58) Field of Search .................. 430/321, 330; 156/196, 99, 163, 275.7; 428/64.2; 427/314, 316

(56) References Cited

FOREIGN PATENT DOCUMENTS

JP         2000173946 A * 6/2000

* cited by examiner

Primary Examiner—Thorl Chea
(74) Attorney, Agent, or Firm—Sughrue Mion, PLLC

(57) ABSTRACT

A method for manufacturing a bonded optical disc includes the steps of coating a solution on a substrate, heating the coated solution and the substrate to thereby form a recording layer on the substrate, and adhering a dummy substrate to the recording layer, wherein the dummy substrate is also heated.

19 Claims, 3 Drawing Sheets

METHOD FOR MANUFACTURING A BONDED OPTICAL DISC

BACKGROUND OF THE INVENTION

1. Field of the Present Invention

The present invention relates to a method for manufacturing a bonded optical disc that records information and comprises a plurality of disc substrates bonded together, such as a DVD.

2. Description of the Related Art

Disc-shaped recording media (optical discs) on which information is recorded and played back by irradiating the optical disc with a laser, such as compact discs (CD-ROMs), recordable compact disc (CD-Rs), digital versatile discs (DVD-ROMs), recordable DVD (DVD-Rs), and rewritable DVD (DVD-RWs), are well known. Optical discs such as DVD-ROMs, DVD-Rs, and DVD-RWs, on which information is recorded at a high density, typically comprise a plurality of disc substrates (normally two) bonded together by an adhesive or the like.

DVD-ROMs, DVD-Rs, and DVD-RWs must be manufactured with high dimensional accuracy because they have an extremely small range of dimensional error allowance with respect to radial-direction warping and circumferential-direction runout.

An example of a method for manufacturing this type of optical disc is shown in FIG. 3A. A coating solution comprising an organic colorant is coated onto the surface of a substrate 50, which is formed by injection molding or the like, and dried (heated) to form a recording layer 52. After the formation of the recording layer, a reflective layer and a protective layer or the like (not shown) are formed. Then, as shown in FIGS. 3B and 3C, a dummy substrate 54 is bonded to the substrate 50.

In this method, heating the substrate 50 disposed with the recording layer 52 causes slight warping of the substrate 50 (i.e., there is a tendency for the recording layer 52 to stretch and for the substrate 50 to shrink). However, since the dummy substrate 54 is not warped because it is not heated (see FIGS. 3A and 3B), slight warping in a resultant optical disc 56 occurs when the dummy substrate 54 is adhered to the recording layer 54 (see FIG. 3C).

SUMMARY OF THE INVENTION

The present invention has been developed taking the foregoing problem into consideration, and an object thereof is to provide a method for manufacturing a bonded optical disc in which warping of the optical disc is substantially eliminated.

The present invention provides a method for manufacturing a bonded optical disc comprising the steps of: coating a solution on a substrate; heating the coated substrate to thereby form a recording layer on the substrate; and adhering a dummy substrate to the recording layer, wherein the dummy substrate is also heated.

DESCRIPTION OF THE PREFERRED EMBODIMENTS

A method for manufacturing a bonded optical disc according to the present invention comprises the steps of coating a solution on a substrate, heating the coated solution and the substrate to thereby form a recording layer on the substrate, and adhering a heated dummy substrate to the substrate with the recording layer.

A preferred embodiment of the invention will be described below with reference to the drawings.

Figure 1:
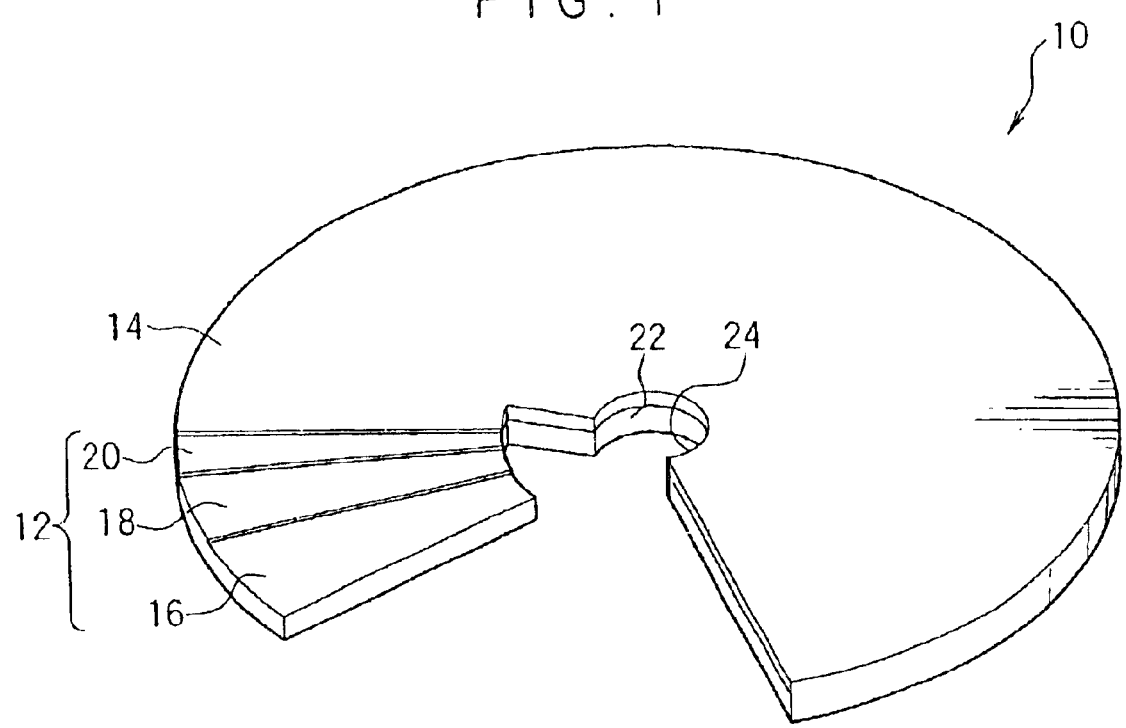
FIG. 1 is a perspective view of an optical disc manufactured by a method for manufacturing a bonded optical disc in accordance with an embodiment of the present invention.
Figure 2A:
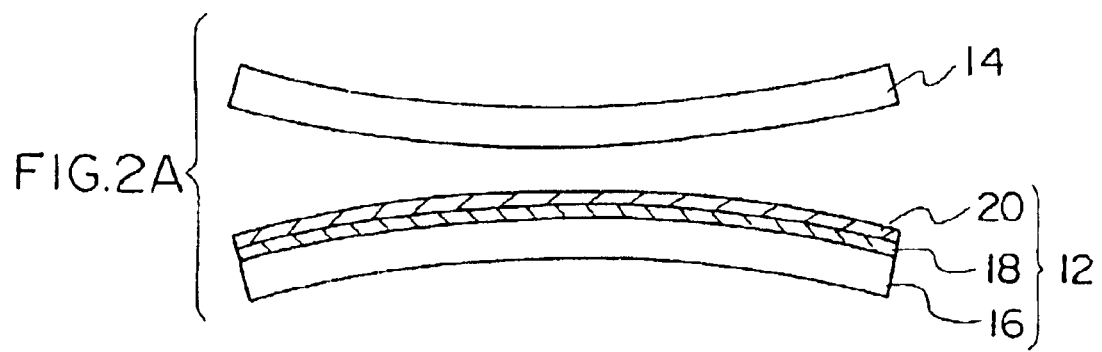
FIGS. 2A and 2B are cross sectional views illustrating the method of the invention.
Figure 2B:
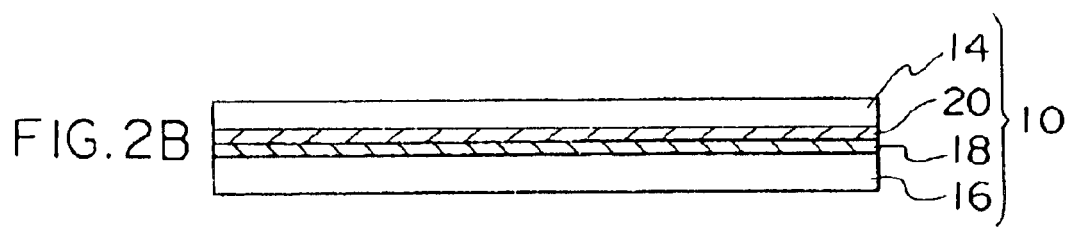
Figure 3A:
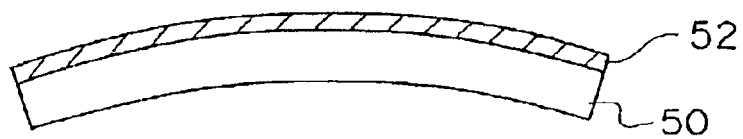
FIGS. 3A, 3B, and 3C are cross sectional views illustrating a conventional method for manufacturing a bonded optical disc.
Figure 3B:
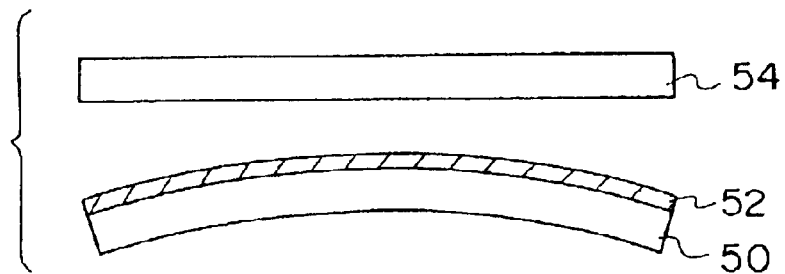
Figure 3C:

FIG. 1 is a perspective view of an optical disc 10 that is manufactured by the method of the invention. FIGS. 2A and 2B illustrate the method of the invention.

As shown in FIG. 1, the optical disc 10 is a DVD-R comprising an annular information-recordable substrate 12 (hereinafter, "the recording substrate 12") and an annular dummy substrate 14. The recording substrate 12 comprises a transparent resin substrate 16 having successively disposed thereon a recording layer 18 and a reflective layer 20. The dummy substrate 14 is similarly formed of a transparent resin and is adhered with an ultraviolet ray-curable adhesive or the like to the side of the recording substrate 12 at which the reflective layer 20 is disposed.

A hole 22 is bored through the center of the recording substrate 12. The center of the dummy substrate 14 also includes a hole 24 that has the same diameter as the hole 22.

Information is recorded on the optical disc 10 by irradiating the recording layer 18 with a laser, which results in changes in the physical or chemical properties of the recording layer 18. Information thus recorded is read by similarly irradiating the recording layer 18 with a laser. Generally, such DVD-Rs have an inner peripheral diameter of 48 mm for the data recording region, an outer peripheral diameter of 116 mm, a minimum track pitch of 0.74 $\mu$m, a linear speed of 3.5 m/s, and a maximum recording capacity of 4.7 GB.

The substrate 16 is formed by, for example, conventional injection molding. Compression molding is also possible, whereby resin that is heated to near melting point is pressed by a stamper, mounted on one side of a molding die of an oil hydraulic press.

A solution for forming the recording layer 18 is then coated onto the substrate 16. There are no limitations on how the solution is coated, but it preferably spin-coated.

The coated substrate 16 is then placed in a heating apparatus (e.g., an oven) and dried, whereby the solution is dried to form the recording layer 18. The solvent is volatized by the heat to thereby improve shelf-life characteristics (e.g., resistance to temperature and moisture) of the optical disc 10. As shown in FIG. 2A, heating the coated substrate 16 generally causes slight warping of the substrate 16 (i.e., there is a tendency for the recording layer 18 to stretch and for the substrate 16 to shrink).

A reflective layer 20 comprising a material containing Au, Ag, or the like, is then spattered or ion-plated onto the recording layer 18.

Heating is preferably conducted at a temperature of 50 to 80° C. and more preferably from 60 to 80° C. Further, a humidity of 50% RH or lower is desired, more preferably 30% RH or lower. The desired time for treatment is from 5 minutes to 2 hours, more preferably from 30 minutes to 1 hour.

The dummy substrate 14 is formed by, for example, injection molding, and is also heated. Heating of the dummy substrate 14 is preferably conducted within a range that is similar to or different from the ranges described above, with consideration given to the materials forming the dummy substrate 14 and the substrate 16, so that the degree of warping produced in the dummy substrate 14 is the same as that of the substrate 16. Generally, it is preferable that the dummy substrate 14 is heated in the same manner as the substrate 16. Here "the same heat treatment" means a heat treatment in which the differences in temperature, in humidity, and in the time for treatment are within ±5° C., ±5% RH, and ±10 minutes respectively of those used in the heat treatment for the substrate 16.

Further, from the point of view of manufacturing, it is preferable that the substrate 16 and the dummy substrate 14 are heated under the same conditions using the same apparatus.

The recording substrate 12 is then set in a spin coater with the substrate 16 facing downward, and an ultraviolet ray-curable adhesive is uniformly spin-coated onto the protective layer 20. The dummy substrate 14 is then adhered to the recording substrate 12 via the adhesive, with the surface made convex due to warping by heating facing downward (see FIG. 2A). The resultant multilayer optical disc 10 is then irradiated with an ultraviolet ray, whereby the adhesive binding the dummy substrate 14 to the recording substrate 12 is cured. In the method of the invention, the dummy substrate 14 is also heated to produce warping therein, as shown in FIG. 2A. Because the warped dummy substrate 14 is adhered to the warped recording substrate 12, it is possible to substantially eliminate warping of the overall resultant optical disc 10.

The recording substrate 12 and the dummy substrate 14 will be described below.

The recording substrate 12 to which the method of the invention is applied comprises the substrate 16 having disposed thereon at least the recording layer 18 and the reflective layer 20. As long as the dummy substrate 14 is adhered to the recording substrate 20 via an ultraviolet ray-curable adhesive, there are no particular limitations on the dummy substrate 14. Specific preferences for the recording substrate 12 and the dummy substrate 14 will be described below.

Recording Substrate

Substrate

Examples of material for the substrate 16 include glass; polycarbonate; acrylic resin (e.g., polymethyl metacrylate); vinyl chloride resin (e.g., polyvinyl chloride resin or vinyl chloride copolymer); epoxy resin; amorphous polyolefin, and polyester. The materials may be used in combination depending on necessity. In view of moisture resistance, stability in dimension and cost, polycarbonate is preferable. The thickness of the substrate 16 generally ranges from 0.4 to 1.5 mm and preferably from 0.5 to 0.7 mm.

A tracking groove or a groove representing an address signal is preferably formed directly in the surface of the substrate 16 at the time the resin material (polycarbonate) is injection- or extrusion-molded.

Although any CD-R or DVD-R substrate may be used in the invention, similar effects can be obtained even when a substrate disposed with a groove having a track pitch that is narrower than the track pitch of a groove in a CD-R or DVD-R is used to achieve higher recording density.

Recording Layer

As long as the recording layer 18 is capable of being recorded by and being played back with a laser, the recording layer 18 may comprise a phase-change metal compound or an organic compound. However, an organic compound is preferable. Examples of preferable organic compounds include the colorants disclosed in Japanese Patent Application Laid-Open (JP-A) No. 4-74690, JP-A No. 8-127174, JP-A No. 11-53758, JP-A No. 11-334204, JP-A No. 11-334205, JP-A No. 11-334206, JP-A No. 11-334207, JP-A No. 2000-43423, JP-A No. 2000-108513, JP-A No. 2000-158818, and triazole, triazine, cyanine, merocyanine, aminobutadiene, phthalocyanine, cinnamic acid, viologen, azo, oxonole, benzoxazole and benzotriazole.

The recording layer 18 is formed by dissolving an organic compound such as the cyanine dye and, as desired, a binder in a solvent to prepare a coating solution that is then coated on the surface of the substrate 16 and dried.

An ultrasonic wave may be employed to dissolve the recording substances in the solvent. Further, according to the application, various kinds of additives, such as antioxidants, ultraviolet absorbents, a plasticizers, and lubricants may be added to the coating solution.

Examples of the binder include natural organic polymer substances, such as gelatin, cellulose derivative, dextran, rosin and rubber or the like; and synthetic organic polymer substance, e.g., hydrocarbon resins such as polyurethane, polyethylene, polypropylene, polystyrene and polyisobutylene or the like; vinyl resins such as polyvinyl chloride, polyvinylidene chloride and polyvinyl chloride-polyvinyl acetate, acrylic resins such as methyl polyacrylate and methyl polymethacrylate; polyvinyl alcohol, chlorinated polyethylene, epoxy resin, butyral resin, rubber derivatives and initial condensation products of thermosetting resins such as phenol-formaldehyde resin or the like. When a binder is included in the recording layer 18, the amount of binder used is generally 0.2 to 20 parts by mass, and preferably 0.5 to 10 parts by mass, and more preferably 1 to 5 parts by mass, per 100 parts by mass of the organic compound. It is possible to improve shelf-life characteristics by including the binder in the recording layer 18.

Various agents to prevent discoloration may also be included in the recording layer 18 to improve resistance to light.

Generally, a singlet oxygen quencher is used as the discoloration preventing agent. Examples thereof include those disclosed in JP-A No. 58-175693, JP-A No. 59-81194, JP-A No. 60-18387, JP-A No. 60-19586, JP-A No. 60-19587, JP-A No. 60-35054, JP-A No. 60-36190, JP-A No. 60-36191, JP-A No. 60-44554, JP-A No. 60-44555, JP-A No. 60-44389, JP-A No. 60-44390, JP-A No. 60-54892, JP-A No. 60-47069, JP-A No. 63-209995, JP-A No. 4-25492, JP-B No. 1-38680, and JP-B No. 6-26028, German Patent No. 350399 application, and the description in the "Journal of the Chemical Society of Japan", October 1992, page 1141.

Reflective Layer

The reflective layer 20 is disposed to improve reflectance when information is played back. A light-reflective substance that is the material for the reflective layer 20 has a 70% or more high reflectance to laser light. Examples thereof include metals or metalloids, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, and stainless steel. These materials may be used alone or in combination or as alloys. A reflective layer containing Au or Ag is preferable. Further, it is preferable that the included amount of Au or Ag is high.

The light-reflective layer 20 can be formed on the recording layer 18 by, for example, vacuum depositing, sputtering or ion plating the light-reflective substance. The thickness of the reflective layer 20 is generally 10 to 800 nm, preferably 20 to 500 nm, and more preferably 50 to 300 nm.

Other Layers

In addition to the recording layer 18 and the reflective layer 20, other layers may be formed if necessary, such as an undercoat between the substrate and the recording layer, or a heat-resistant protective layer (a spattered layer) on either side or both sides of the reflective layer.

Dummy Substrate

Although there are no particular limitations on the dummy substrate 14, it preferably comprises the same material as the substrate 16 in order to equalize (cancel out) warping of the substrate 16 generated by storage in hot or cold temperatures, curing of the adhesive, or heating.

EXAMPLES

Example 1

A polycarbonate resin (trade name: PANLITE AD5503 produced by Teijin Chemicals Ltd.) was injection molded to produce a resin substrate.

Consequently, 1.0 g of a colorant A and 0.5 g of a colorant B described below were blended and dissolved in 100 cc 1,1,2,2,-tetrafluoro-1-propanol using an ultrasonic vibrator (1800 W) over 2 hours to prepare a solution for forming a recording layer.

Colorant A:

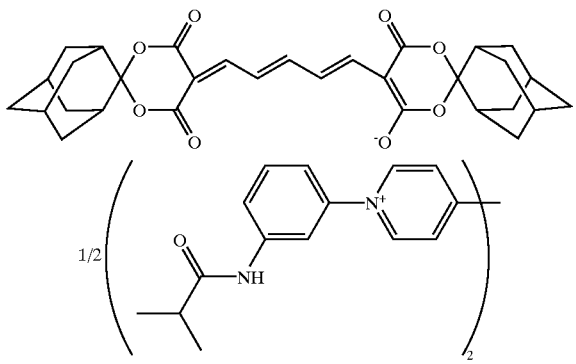

Colorant B:

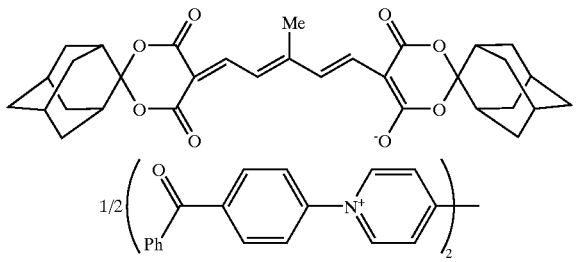

The solution was spin-coated onto a pregrooved surface of the polycarbonate substrate while varying rotational frequency from 300 to 4,000 rpm. With respect to coating conditions, temperature was 23° C. and humidity was 50% RH, with the temperature of the solution and the substrate being 23° C. and pumping speed being 0.1 m/second.

The coated substrate was dried (heated) for 2 hours at 60° C. The recording layer (thickness of approximately 150 nm in the pregroove) was then formed after removing the residual solvent from the recording layer.

Ag was then spattered on the recording layer to form a reflective layer having a thickness of 150 nm. An ultraviolet ray-curable resin (trade name: SD318, produced by Dainippon Ink and Chemicals, Inc.) was spin-coated onto the reflective layer while varying rotational frequency from 50 to 5000 rpm. The resin was then cured by being irradiated with an ultraviolet ray from a high-pressure mercury lamp, whereby a protective layer having a thickness of 8 μm was formed.

A write-once optical recording medium (recording substrate) comprising a substrate, a recording layer, a reflective layer, and a protective layer was thus manufactured.

Thereafter, a substrate comprising the same material and formed in the same manner as the substrate disposed with the recording layer was heated in the same manner (at 60° C. for 2 hours) as described above. Ag was spattered onto the heated substrate to form a layer having a film thickness of 150 nm. A protective layer was then formed by an ultraviolet ray-curable resin (trade name: SD318, produced by Dainippon Ink And Chemicals, Inc.) to complete the manufacture of a dummy substrate for bonding.

An ultraviolet ray-curable resin (trade name: SD640, produced by Dainippon Ink and Chemicals, Inc.) was spin-coated at a rotational frequency of 60 rpm onto the protective layer of the recording substrate. Thereafter, the rotation was stopped, the dummy substrate was disposed on the resin-coated protective layer, and then rotation was resumed at 4,400 rpm to spread the resin adhesive between the dummy substrate and the recording substrate. The dummy substrate and the recording substrate were then irradiated with an ultraviolet ray from a high-pressure mercury lamp, whereby the resin adhesive was cured to bond the dummy substrate to the recording substrate. An optical disc of Example 1 was thus obtained.

Comparative Example 1

An optical disc was obtained in the same manner as described in Example 1, except that the dummy substrate was not heated during the manufacture of the dummy substrate.

Evaluation

In comparison with the optical disc of the Comparative Example 1, in which the dummy substrate was not heated, the optical disc of Example 1, in which the dummy substrate was heated in the same manner as the recording substrate to which it was adhered, showed reduced radial-direction warping. Moreover, circumferential-direction runout was also reduced.

What is claimed is:

1. A method for manufacturing a bonded optical disc comprising the steps of:
    coating a solution on a substrate;
    heating the coated substrate to thereby form a recording layer on the substrate; and
    adhering a dummy substrate to the recording layer,
    wherein the dummy substrate is also heated.

2. The method of claim 1, wherein the heat applied to the substrate and the heat applied to the dummy substrate are substantially the same.

3. The method of claim 1, wherein the temperatures of the heat applied to the substrate and the heat applied to the dummy substrate are 50 to 80° C.

4. The method of claim 1, wherein the temperatures of the heat applied to the substrate and the heat applied to the dummy substrate are 60 to 80° C.

5. The method of claim 1, wherein humidity during heating of the substrate and heating of the dummy substrate is no higher than 50% RH.

6. The method of claim 3, wherein humidity during heating of the substrate and heating of the dummy substrate is no higher than 50% RH.

7. The method of claim 1, wherein humidity during heating of the substrate and heating of the dummy substrate is no higher than 30% RH.

8. The method of claim 4, wherein humidity during heating of the substrate and heating of the dummy substrate is no higher than 30% RH.

9. The method of claim 1, wherein the substrate and the dummy substrate are heated for 5 minutes to 2 hours.

10. The method of claim 3, wherein the substrate and the dummy substrate are heated for 5 minutes to 2 hours.

11. The method of claim 5, wherein the substrate and the dummy substrate are heated for 5 minutes to 2 hours.

12. The method of claim 6, wherein the substrate and the dummy substrate are each heated for 5 minutes to 2 hours.

13. The method of claim 1, wherein the substrate and the dummy substrate are each heated for 30 minutes to 1 hour.

14. The method of claim 4, wherein the substrate and the dummy substrate are each heated for 30 minutes to 1 hour.

15. The method of claim 7, wherein the substrate and the dummy substrate are each heated for 30 minutes to 1 hour.

16. The method of claim 8, wherein the substrate and the dummy substrate are each heated for 30 minutes to 1 hour.

17. The method of claim 1, wherein the temperature of the heat applied to the substrate and the temperature of the heat applied to the dummy substrate are within 5° C. of one another.

18. The method of claim 1, wherein humidity during heating of th substrate and the humidity of heating of the dummy substrate are within 5% RH of one another.

19. The method of claim 1, wherein a time of heating of the substrate and a time of heating of the dummy substrate are within 10 minutes of one another.

* * * * *